Patented Jan. 9, 1940

2,186,608

UNITED STATES PATENT OFFICE 2,186,608

METHINE DYES AND A PROCESS FOR THE PREPARATION THEREOF

Grafton H. Keyes, Rochester, N. Y., assignor to Eastman Kodak Company, Rochester, N. Y., a corporation of New Jersey No Drawing. Original application June 4, 1937, Serial No. 146,425. Divided and this application August 31, 1938, Serial No. 227,853

20 Claims. (Cl. 260—240)

This invention relates to dyes and to a process for the preparation thereof.

Certain dyes are known to alter the sensitivity of photographic silver halide emulsions. For example, certain dyes of the cyanine class have been found to alter the sensitivity of photographic emulsions. Dyes of the merocyanine class (see U. S. Patent No. 2,078,233, dated April 27, 1937) have been found to sensitize photographic emulsions. More recently, certain dyes of the hemioxonol class have been found to alter the sensitivity of photographic emulsions (see a copending application of Leslie G. S. Brooker, Serial No. 101,105, filed September 16, 1936). However, not all dyes alter the sensitivity of photographic emulsions. In order for a dye to sensitize a photographic silver halide emulsion, it must not only be adsorbed by the silver halide in the emulsion, but must be so adsorbed that a proper exchange of energy between the dye and the silver halide obtains. It is, of course, impossible to forecast whether or not a dye will be adsorbed on a silver halide and whether or not the dye will be adsorbed in a manner which permits the proper exchange of energy between the dye and the silver halide.

I have now found an entirely new class of dyes. I have further found that these new dyes sensitize photographic silver halide emulsions in a new and useful manner. See my copending application Serial No. 146,425, filed June 4, 1937, of which the instant application is a division.

An object of my present invention, therefore, is to provide new dyes. A further object is to provide new photographic sensitizing dyes. A still further object is to provide a process for preparation of my new dyes. Other objects will appear hereinafter.

The dyes of my invention can, for convenience, be illustrated by the following general formula:

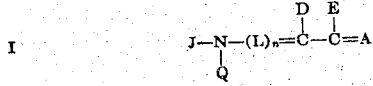

wherein A represents a divalent non-metallic atom of the oxygen group, such as oxygen or sulfur, L represents a methenyl group, $n$ represents a positive odd integer not greater than five, D and E each represent an organic (carbon-containing) group or D and E together represent the non-metallic atoms necessary to complete a cyclic organic nucleus. J represents hydrogen or an aliphatic group while Q represents an aliphatic group, or J and Q together represent the non-metallic atoms necessary to complete a cyclic basic nucleus other than a pyrrol nucleus. The term "aliphatic group" is intended to include saturated as well as unsaturated aliphatic groups and to include also substituted aliphatic groups, e. g., benzyl, β-hydroxyethyl, or the like.

A preferred group of my new dyes (among the members of which are very good photographic sensitizers) can be illustrated by the following formula:

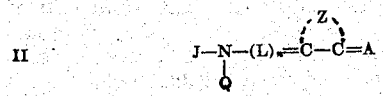

wherein A, L, $n$, J and Q have the values indicated above under Formula I, and Z represents the non-metallic atoms necessary to complete a heterocyclic nucleus, e. g., a five-membered or six-membered heterocyclic nucleus.

More particularly, in Formulas I and II, J and Q can each represent an alkyl group, such as methyl, ethyl, n-butyl, allyl, benzyl, β-hydroxyethyl, furylmethyl (furfuryl) or the like and J and Q together can represent the non-metallic atoms necessary to complete an organic cyclic basic nucleus, such as a piperidine, a tetra-hydroquinoline, a N-alkylpiperazine, a piperazine, a morpholine or like basic nucleus. Z can represent the non-metallic atoms necessary to complete a five-membered heterocyclic nucleus, such as a thiazolone nucleus, for example, a 2,4(3,5)-thiazoledione nucleus, such as 2,4(3,5)-thiazoledione, 3-alkyl-2,4(3,5)-thiazoledione, 3-phenyl-2,4(3,5)-thiazoledione or 3-naphthyl-2,4(3,5)-thiazoledione nuclei, a 2-thio-2,4(3,5)-thiazoledione (a rhodanine) nucleus, such as 3-alkyl-2-thio-2,4(3,5)-thiazoledione (3-alkylrhodanine) 3-phenyl-2-thio-2,4(3,5)-thiazoledione (3-phenylrhodanine, 3-naphthyl-2-thio-2,4(3,5)-thiazoledione (3-naphthylrhodanine) nuclei or 3-(1-benzothiazyl)-2-thio-2,4(3,5)-thiazoledione (3-(1-benzothiazyl)-rhodanine) nuclei, a 2,4-dithio-2,4(3,5)-thiazoledione (4-thiorhodanine) nucleus, such as 2,4-dithio-2,4(3,5) thiazoledione or its 3-alkyl, 3-phenyl or 3-naphthyl derivatives, a 2-alkylmercapto-4(5)-thiazolone nucleus, such as 2-ethylmercapto-4(5)-thiazolone, a thiazolidone nucleus, such as 4-thiazolidone or its 3-alkyl 3-phenyl or 3-naphthyl derivatives a 2-alkylphenylamino-4(5)-thiazolone nucleus or a 2-diphenylamino-4(5)-thiazolone nucleus; an oxazolone nucleus, for example, a 2-thio-2,4(3,5)-oxazoledione nucleus, such as a 3-alkyl-2-thio-2,4(3,5)-oxazoledione nucleus; an imidazolone nucleus, for example a 2,4(3,5)-imidazoledione nucleus, such as 2,4(3,5)-imidazoledione (hydantoin) or its 3- alkyl, 3-phenyl or 3-naphthyl derivatives as well as its 1,3-dialkyl, 1-alkyl-3-phenyl, 1-alkyl-3-naphthyl, 1,3-diphenyl, etc. derivatives, a 2-thio-2,4(3,5)-imidazoledione nucleus, such as 2-thio-2,4(3,5)-imidazoledione (2-thiohydantoin) or its 3-alkyl, 3-phenyl or 3-naphthyl derivatives as well as its 1,3-dialkyl, 1-alkyl-3-phenyl, 1-alkyl-3-naphthyl, 1,3-diphenyl, etc. derivatives, a 4-thio-2,4(3,5)-imidazoledione nucleus, such as 4-thio-2,4(3,5)-imidazoledione (4-thiohydantoin) or its 3-alkyl, 3-phenyl or 3-naphthyl derivatives as well as its 1,3-dialkyl, 1-alkyl-3-phenyl, 1-alkyl-3-naphthyl, 1,3-diphenyl etc. derivatives, a 2-alkylmercapto-5(4)-imidazolone, such as 2-propylmercapto-5(4)-imidazolone; a thionaphthenone nucleus, such as 2-(1)-thionaphthenone or 1(2)-thionaphthenone, a pyrazolone nucleus, for example a 5-thiopyrazolone, such as 1-phenyl-3-methyl-5-thiopyrazolone; an oxindole nucleus, such as 2,3-dihydro-3-ketoindole, and like five-membered heterocyclic nuclei. The dyes containing a five membered heterocyclic nuclei containing both a nuclear nitrogen and a nuclear sulfur atom give rise to emulsions of particular utility. The dyes containing a five-membered heterocyclic nuclei containing a nuclear nitrogen atom and a nuclear thiocarbonyl group, I have found, are also very well adapted to the production of useful photographic emulsions. A can also represent the non-metallic atoms necessary to complete a six-membered heterocyclic nucleus, such as a 2,4,6-triketohexahydropyrimidine nucleus, for example barbituric acid or 2-thiobarbituric acid as well as their 1-alkyl or 1,3-dialkyl derivatives; a 3,4-dihydro-2(1)-quinolone nucleus, such as 3,4-dihydro-2(1)-quinolone (dihydrocarbostyril); a 3,4-dihydro-2(1)-quinoxalone nucleus, such as 3,4-dihydro-2(1)-quinoxalone (oxydihydroquinoxaline); 3-phenomorpholone (1,4,3-bonzoxazine-3(4)-one or benzo-β-morpholone) nuclei; 1,4,2-benzothiazine-3(4)-one ketodihydrobenzoparathiazine) nuclei and the like six-membered heterocyclic nuclei. The dyes containing a six-membered nuclei containing two nuclear nitrogen atoms or a nuclear nitrogen atom and a nuclear sulfur atom are especially well adapted to the manufacture of photographic emulsions, I have found.

The new dyes of my invention characterized by Formula II can be prepared by reacting a basic primary or secondary non-aromatic amine, particularly a monoamine, with a compound of the following formula.

III 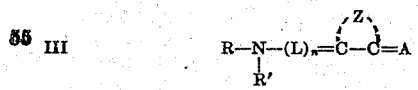

wherein A represents a divalent non-metallic atom, such as oxygen or sulfur, L represents a methenyl group, n represents a positive odd integer not greater than five, R represents an acyl group, such as acetyl, propionyl or benzoyl, R' represents an aryl group, such as a phenyl, a diphenyl, a xylyl or a naphthyl group, i. e. an aryl group of twelve or less nuclear carbon atoms, for example, and Z represents the non-metallic atoms necessary to complete a heterocyclic nucleus, such as the five-membered or six-membered heterocyclic nucleus illustrated above in connection with Formula II. Compounds represented by Formula III are described in the copending application of Leslie G. S. Brooker, Serial No. 101,105, filed September 16, 1936. Certain compounds (where n equals one) represented by Formula III have also been described by Dains et al. See for example J. Am. Chem. Soc. 31, 1148 (1909); 35, 959 (1913); 38, 1841 (1916); 40, 562 (1918); 44, 2310 (1922) and Ber. 35, 2496 (1902).

As shown in the above referred to application of Leslie G. S. Brooker compounds of Formula III can be prepared by first reacting a compound of the following formula:

IV 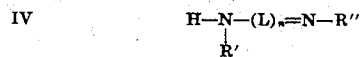

wherein L represents a methenyl group, n represents a positive odd integer not greater than five, and R' and R'' represent aryl groups, such as phenyl, xylyl, diphenyl or naphthyl, with a heterocyclic compound of the following formula:

V 

wherein A represents a divalent non-metallic atom, such as oxygen or sulfur, and Z represents the non-metallic atoms necessary to complete a heterocyclic nucleus, such as the five-membered or six-membered heterocyclic nuclei pointed out above under Formula II. Some of the compounds represented by Formula IV are basic and accordingly form salts with acids such as hydrochloric, sulfuric and the like. These salt forms can be used as well to react with the compounds of Formula V. Examples of compounds of Formula IV and their salts which can be advantageously employed are: diphenylformamidine, β-anilinoacrolein anil and its hydrochloride, β-anilino-α-bromo-acrolein anil, β-anilino-α-chloro-acrolein anil and their hydrochlorides, glutaconic-aldehyde dianilide hydrochloride, α-(β-naphthylimino-ε-(β-naphthylamino)-α-methyl-α,γ-pentadiene hydrochloride (see König, Journal fur praktische Chemie, vol. 69 page 136), etc. Compounds such as diphenyl formamidine are advantageously reacted with compounds of Formula V, in the presence of a petroleum fraction, e. g., kerosene, as shown in the examples below. Compounds such as β-anilinoacrolein anil or glutaconic aldehyde or their hydrochlorides or other salts can be reacted with compounds of Formula V by heating the substances together, advantageously in the presence of a strong tertiary organic base.

The reaction products of compounds of Formula IV and compounds of Formula V can be advantageously converted into their acylated derivatives, i. e., the compounds of Formula III, by treatment with organic acid anhydrides, such as acetic, propionic, butyric or benzoic anhydrides. This conversion can be effected during the reaction of compounds of Formula IV with compounds of Formula V, as illustrated below. Other methods of forming the acylated compounds of Formula III, can be employed such as treatment with acid chlorides instead of acid anhydrides. I have found the acetylated compounds of Formula III very suitable for preparing my new dyes.

Basic non-aromatic primary or secondary amines which can be used to react with compounds of Formula III are, for example, aliphatic amines for instance, monoalkylamines, such as methylamine, ethylamine, n-butylamine, sec-butylamine, isopropylamine, n-decylamines, allyl-amine, cyclohexylamine, furylmethylamine, tetrahydrofurylmethyl-amine, benzylamine, β-hydroxyethylamine, or the like or dialkyl-amines, such as dimethylamine, diethyl-amine, di-n-butyl-amine, di-β-hydroxyethylamine, diallylamine or the like, or heterocyclic basic secondary amines for instance five-membered heterocyclic secondary amines, such as pyrrolidenes, or the like, or six-membered heterocyclic basic secondary amines, such as piperidine, piperazine, N-alkylpiperazines, 1,2,3,4-tetrahydroquinoline, morpholines or the like. Pyrrol cannot be employed in my process.

By the term "non-aromatic amines," I mean an amine in which the amino group is not directly attached to a benzene ring or like aromatic ring system as the amino group is in aniline, methylaniline, α- and β-naphthylamine, 1-aminoanthraquinone, α-aminopyridine, 5-aminoquinoline, etc.

Compounds of Formula V are all characterized by containing a nuclear methylene group adjacent to a nuclear carbonyl group, such as an oxocarbonyl or thiocarbonyl group.

The basic non-aromatic primary or secondary amines are advantageously reacted with the compounds of Formula III in the presence of a diluent, such as a lower aliphatic alcohol, i. e., one of four carbon atoms or less. However, the diluent is not essential. If used, the diluent is advantageously substantially anhydrous. Other diluents such as ethylidene dichloride, ethylene dichloride or dioxane can be used. The diluent should be inert toward the dyes and is advantageously chosen so that the formed dye will separate therefrom at least upon cooling the reaction mixture. Heat accelerates the formation of my new dyes. The basic non-aromatic primary or secondary amine is advantageously employed in molecular excess, from 1.5 to 3 molecular proportions (mol.) per molecular proportion of compound of Formula III is suitable. With a molecular ratio of 1:1 the yield of my new dyes is generally lower than when an excess of the non-aromatic amine is employed.

While the process of preparing my new dyes is subject to variation particularly as respects the nature and quantities of reactants, the nature and quantity of diluent employed and the temperatures, the following examples will serve to illustrate the mode of preparation of the dyes of Formula II where $n$ represents one. These examples are not intended to limit my invention.

EXAMPLE 1

5-(1-piperidyl)-methylene-3-phenylrhodanine

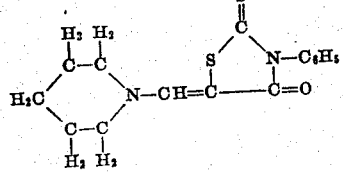

0.9 g. (1 mol.) of 5-acetanilidomethylene-3-phenylrhodanine, 0.6 g. (3 mol.) of piperidine and 30 cc. of absolute ethyl alcohol were heated under reflux for about 30 minutes. The dye separated from the cooled reaction mixture and after two recrystallizations from methyl alcohol formed yellow needles melting at 286–288° C.

The 5-acetanilidomethylene-3-phenylrhodanine used in the above example was prepared by heating under reflux for about 15 minutes 1.55 g. (1 mol.) of 5-anilinomethylene-3-phenylrhodanine, 15 cc. of acetic anhydride and 0.5 g. (1 mol.) of triethylamine. The crude product was recrystallized twice from methyl alcohol and was obtained as minute yellow crystals melting at 194–198° C. with decomposition. The 5-anilinomethylene-3-phenylrhodanine was prepared according to the method of Dains, Kansas Univ. Science Bull. 15, 265 (1924) by heating together equimolecular proportions of 3-phenylrhodanine and diphenylformamidine in kerosene (about 300 cc. per gram molecular proportion of 3-phenylrhodanine is suitable) at about 120° C. The reaction product separated and was washed with methyl alcohol. It was recrystallized from glacial acetic acid.

EXAMPLE 2

3-ethyl-5-(1-piperidyl)-methylenerhodanine

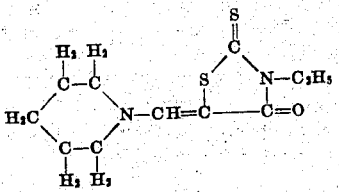

9.75 g. (1 mol.) of 5-acetanilidomethylene-3-ethylrhodanine, 9.6 g. (3 mol.) of piperidine and 15 cc. of absolute ethyl alcohol were heated under reflux for about 30 minutes. The dye separated from the cooled reaction mixture. It was twice recrystallized from methyl alcohol and was obtained as pale yellow needles melting at 150.5–152.5° C. Its methyl alcohol solution was pale yellow.

The 5-acetanilidomethylene-3-ethylrhodanine employed above was prepared by refluxing, for about 10 minutes, 1.3 g. (1 mol.) of 5-anilinomethylene-3-ethylrhodanine with 10 cc. of acetic anhydride and 0.5 of triethylamine. The crude product was twice recrystallized from methyl alcohol and obtained as pale yellow crystals melting at 128–130° C. The 5-anilinomethylene-3-ethylrhodanine was prepared by heating together equimolecular proportions of 3-ethylrhodanine and diphenylformamidine according to the method of Dains (see Ex. 1).

EXAMPLE 3

5-(4-morpholyl)-methylene-3-ethyl-2-thio-2,4(3,5) oxazoledione

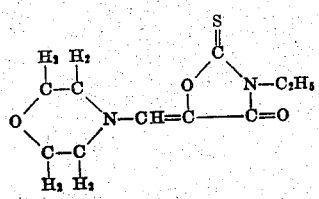

9.7 g. (1 mol.) of 5-acetanilidomethylene-3-ethyl-2-thio-2,4(3,5)-oxazoledione, 0.7 g. (3 mol.) morpholine and 10 cc. absclute ethyl alcohol were heated under reflux for about 30 minutes. The dye separated from the cooled reaction mixture. It was recrystallized from water and was obtained as colorless crystals melting at 164–6° C. with decomposition. It gave a colorless aqueous solution.

The 5-acetanilidomethylene-3-ethyl-2,4(3,5) oxazoledione employed in the above example was prepared by heating 8.7 g. (1 mol.) of 5-anilinomethylene-3-ethyl-2,4(3,5) oxazoledione with 30 cc. of acetic anhydride and 3.7 g. (1 mol.) of triethylamine at 100° C. for about 10 minutes. The crude product separated from the cooled reaction mixture. It was twice recrystallized from methyl alcohol and obtained as nearly colorless crystals, melting at 158–160° C. The 5-anilinomethylene- 3-ethyl-2,4(3,5) oxazoledione was obtained according to the method of Dains as illustrated in Example 1 by heating equimolecular proportions of diphenylformamidine and 3-ethyl-2,4(3,5)-oxazoledione together in kerosene.

In the above examples, the piperidine and morpholine can be replaced with other basic primary or secondary non-aromatic amines such as pointed out above in connection with reaction with compounds of Formula III. Likewise the 3-ethylrhodanine and 3-phenylrhodanine can be replaced by other heterocyclic compounds containing a nuclear methylene group adjacent to a nuclear carbonyl group, such as correspond to the five-membered and six-membered heterocyclic nuclei pointed out under Formula II above, for example.

The following examples will serve to illustrate the formation of the dyes of Formula II, where $n$ represents three. These examples are not intended to limit my invention.

EXAMPLE 4

3-ethyl-5-[γ-(1-piperidyl) allylidene]-rhodanine

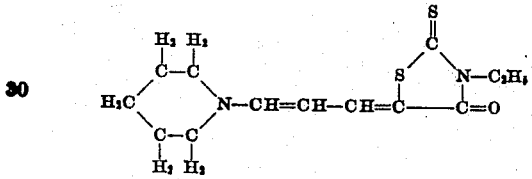

0.8 g. (1 mol.) of 5-(γ-acetanilidoallylidene)-3-ethylrhodanine, 0.6 g. (3 mol.) of piperidine and 15 cc. of alsolute ethyl alcohol were heated under reflux for about 30 minutes. The dye separated from the cooled reaction mixture. It was twice recrystallized from methyl alcohol and obtained as light brownish crystals having a bluish reflux and melting at 187–9° C. with decomposition. Its methyl alcoholic solution was deep yellow.

The 5 - (γ-acetanilidoallylidene) -3-ethylrhodanine employed above was prepared by refluxing 3.2 g. (1 mol.) of 3-ethylrhodanine, 5.2 g (1 mol.) of β-anilinoacrolein anil hydrochloride and 30 cc. of acetic anhydride for about one hour. The reaction product separated from the cooled reaction mixture and after two recrystallizations from acetic acid was obtained as pale yellow crystals melting at 225.5–226.5° C.

EXAMPLE 5

3-ethyl-5-[γ-(4-morpholyl) allylidene]-rhodanine

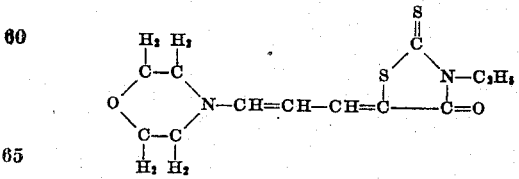

0.8 g. (1 mol.) of 5-(γ-acetanilidoallylidene)-3-ethylrhodanine, 0.7 g. (3 mol.) of morpholine and 15 cc. of absolute ethyl alcohol were heated under reflux for about 30 minutes. The dye separated from the cooled reaction mixture and after two recrystallizations from methyl alcohol was obtained as minute orange red crystals, melting at 225.5–227.5° C. with decomposition. Its methyl alcoholic solution was yellow.

EXAMPLE 6

5-(γ-diethylaminoallylidene)-3-ethylrhodanine

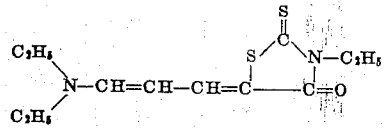

0.8 g. (1 mol.) of 5-(γ-acetanilidoallylidene)-3-ethylrhodanine, 0.6 g. (3 mol.) of diethylamine and 15 cc. of absolute ethyl alcohol were heated under reflux for about 30 minutes. The dye separated from the cooled reaction mixture and after two recrystallizations from methyl alcohol formed amber needles with a blue reflux, melting at 133–135° C. with decomposition. Its methyl alcoholic solution was yellow.

EXAMPLE 7

2-diphenylamino-5-[γ-(1-piperidyl)-allylidene]-4(5)-thiazolone

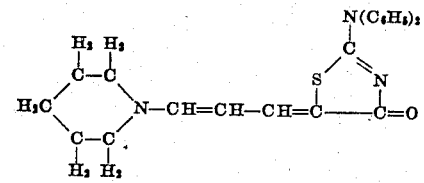

1.0 g. (1 mol.) of 5-(γ-acetanilidoallylidene)-2-diphenylamino-4(5)-thiazolone, 0.6 g. (3 mol.) of piperidine and 25 cc. of absolute ethyl alcohol were heated under reflux for about 30 minutes. The dye separated from the cooled reaction mixture. After two recrystallizations from ethyl alcohol, the dye was obtained as brownish yellow crystals melting at 251–253° C. with decomposition. Its ethyl alcoholic solution was yellow.

The 5-(γ-acetanilidoallylidene)-2-diphenylamino-4(5)-thiazolone employed above was made by refluxing 2.7 g. (1 mol.) of 2-diphenylamino-4(5)-thiazolone, 2.6 g. (1 mol.) of β-anilinoacrolein anil hydrochloride and 20 cc. of acetic anhydride for about 30 minutes. The crude product separated from the cooled reaction mixture and after two recrystallizations from methyl alcohol was obtained as yellow crystals melting at 265–267° C.

EXAMPLE 8

3-ethyl-5-[γ-(piperidyl) allylidene]-2-thio-2,4(3,5)-oxazoledione

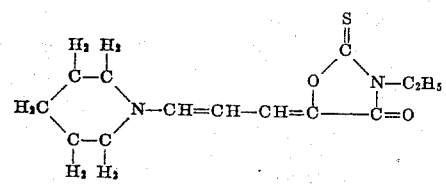

1.6 g. (1 mol.) of 5-(γ-acetanilidoallylidene)-3-ethyl-2-thio-2,4(3,5)-oxazoledione, 1.2 g. (3 mol.) of piperidine and 10 cc. absolute ethyl alcohol were heated under reflux for about 30 minutes. The dye separated from the cooled reaction mixture. After two recrystallizations from 70% aqueous ethyl alcohol, the dye was obtained as orange yellow crystals melting at 120.5–123.5 with decomposition. The ethyl alcoholic solution of the dye was yellow.

The 5-(γ-acetanilidoallylidene) - 3 - ethyl- 2 -thio-2,4(3,5)-oxazoledione employed above was prepared by refluxing 2.9 g. (1 mol.) of 3-ethyl-2-thio-2,4(3,5)-oxazoledione, 5.2 g. (1 mol.) of β-anilinoacrolein anil hydrochloride, 30 cc. of absolute ethyl alcohol and 2.0 g. (2 mol.) of triethylamine for about 30 minutes. The crude product, 5-(γ-anilinoallylidene)-3-ethyl-2-thio-2,4(3,5)-oxazoledione, separated from the cooled reaction mixture. 5.8 g. (1 mol.) of this crude product, 30 cc. of acetic anhydride and 2.0 g. (1 mol.) of triethylamine were heated to refluxing for about 5 minutes. The product separated from the cooled reaction mixture and after two recrystallizations from methyl alcohol was obtained as minute greenish yellow crystals melting at 247-249° C. with decomposition.

EXAMPLE 9

1-benzothiazyl-3-methyl-4-[γ-(piperidyl) allylidene]-5-pyrazolone

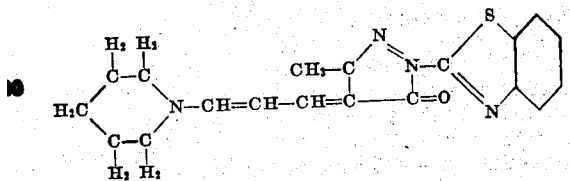

1.0 g. (1 mol.) of 4-(γ-acetanilidoallylidene)-1-benzothiazyl-3-methyl-5-pyrazolone, 0.6 g. (3 mol.) of piperidine and 10 cc. absolute ethyl alcohol were refluxed for about 30 minutes. The dye separated from the cooled reaction mixture. After two recrystallizations from methyl alcohol, the dye was obtained as reddish crystals with a greenish reflux melting at 256-258° C. with decomposition. Its methyl alcoholic solution was purplish orange.

The 4-(γ-acetanilidoallylidene)-1-benzothiazyl-3-methyl-5-pyrazolone employed above was prepared by refluxing 4.6 g. (1 mol.) of 1-benzothiazyl-3-methyl-5-pyrazolone, 5.2 g. (1 mol.) of β-anilinoacrolein anil hydrochloride and 25 cc. of acetic anhydride for about 10 minutes. The product separated from the cooled reaction mixture and was used without recrystallization.

EXAMPLE 10

3-ethyl-1-phenyl-5-[γ-(1-piperidyl) allylidene]-2-thiohydantoin

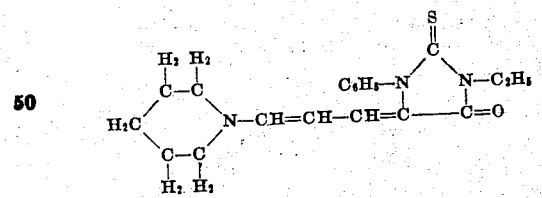

1 g. (1 mol.) of 5-(γ-acetanilidoallylidene)-3-ethyl-1-phenyl-2-thiohydantoin, 0.6 g. (3 mol.) of piperidine and 25 cc. of absolute ethyl alcohol were refluxed for about 30 minutes. The dye separated from the cooled reaction mixture. It was recrystallized twice from methyl alcohol and obtained as reddish crystals melting at 189-191° C. with decomposition.

The 5-(γ-acetanilidoallylidene)-3-ethyl-1-phenyl-2-thiohydantoin, was prepared by refluxing 4.4 g. (1 mol.) of 3-ethyl-1-phenyl-2-thiohydantoin, 5 g. (1 mol.) of β-anilinoacrolein anil hydrochloride, 30 cc. of absolute ethyl alcohol and 2.0 g. (1 mol.) of triethylamine were refluxed for about 30 minutes. The crude product separated from the cooled reaction mixture and was used without recrystallization. 1.75 g. (1 mol.) of this crude product, 10 cc. of acetic anhydride and 0.5 g. (1 mol.) of triethylamine were heated at 100° C. for about 15 minutes. The product separated from the cooled reaction mixture and after two recrystallizations from methyl alcohol formed yellow crystals melting at 184-186° C. with decomposition.

EXAMPLE 11

3-methyl-1-phenyl-4-[γ-(1-piperidyl)-allylidene]-5-pyrazolone

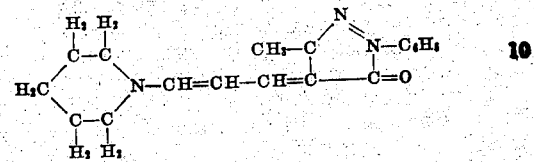

0.85 g. (1 mol.) of 4-(γ-acetanilidoallylidene)-3-methyl-1-phenyl-5-pyrazolone, 0.6 g. (3 mol.) of piperidine and 10 cc. of absolute ethyl alcohol were heated under reflux for about 30 minutes. The dye separated from the cooled reaction mixture. It was twice recrystallized from methyl alcohol and obtained as orange crystals melting at 187-189° C. Its methyl alcoholic solution was yellow.

The 4-(γ-acetanilidoallylidene)-3-methyl-1-phenyl-5-pyrazolone employed above was prepared by refluxing 3.5 g. (1 mol.) of 3-methyl-1-phenyl-5-pyrazolone, 5 g. (1 mol.) of β-anilinoacrolein anil hydrochloride, 20 cc. of acetic anhydride and 2 g. (1 mol.) of triethylamine for about 30 minutes. The product separated from the cooled reaction mixture and after two recrystallizations from methyl alcohol was obtained as flaky orange crystals melting at 212-214° C. with decomposition.

In the above eight examples, the piperidine, morpholine and diethylamine can be replaced by any of the basic primary or secondary non-aromatic amines pointed out above in connection with reaction with compounds of Formula III. Likewise the 3-ethyl-2-thio-2,4(3,5)-oxazoledione, 1-benzothiazyl-3-methyl-5-pyrazolone, 3-ethyl-1-phenyl-2-thiohydantoin, 3-methyl-1-phenyl-5-pyrazolone, 3-ethylrhodanine, 2-diphenylamino-4(5)-thiazolone, 4-thiorhodanine and barbituric acid can be replaced with any heterocyclic compound containing a nuclear methylene group adjacent to a nuclear carbonyl group, such as correspond to the five-membered and six-membered heterocyclic nuclei pointed out above under Formula II, for example. The dyes derived from piperidine are especially well adapted to the manufacture of photographic emulsions, I have found.

The following examples serve to illustrate the preparation of the dyes of Formula II where n equals five. These examples are not intended to limit my invention.

EXAMPLE 12

3'-ethyl-5-[5-(1-piperidyl)-Δ²,⁴-pentadienylidene]-rhodanine

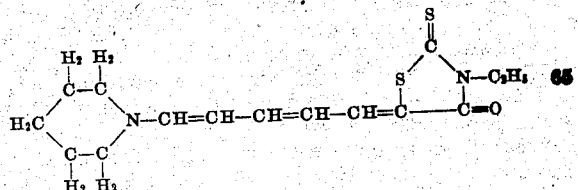

0.9 g. (1 mol.) of 5-(5-acetanilido-Δ²,⁴-pentadienylidene)-3-ethylrhodanine, 0.6 g. (3 mol.) of piperidine and 20 cc. of absolute ethyl alcohol were heated under reflux for about 30 minutes. The dye separated from the cooled reaction mixture and was recrystallized twice from 95% ethyl alcohol. The dye was obtained as dark blue needles melting at 168-171° C. with decomposition. Its solution in ethyl alcohol was bluish red.

The 5-(5-acetanilido-$\Delta^{2,4}$-pentadienylidene)-3-ethylrhodanine employed above was prepared by refluxing 3.2 g. (1 mol.) of 3-ethylrhodanine, 5.6 g. (1 mol.) of glutaconic aldehyde dianilide hydrochloride, 40 cc. of absolute ethyl alcohol and 2 g. (1 mol.) of triethylamine for about three minutes. The product separated from the cooled reaction mixture and without recrystallization was heated to boiling with 50 cc. of acetic anhydride. The product separated from the cooled reaction mixture and was used without recrystallization.

EXAMPLE 13

3 - ethyl - 5 - [5 - (4 - morpholyl) - $\Delta^{2,4}$ - pentadienylidene]-rhodanine

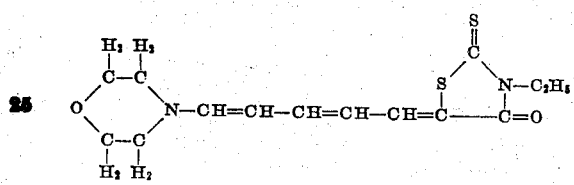

0.9 g. (1 mol.) of 5-(5-acetanilido-$\Delta^{2,4}$-pentadienylidene-3-ethylrhodanine, 0.7 g. (3 mol.) of morpholine and 25 cc. of absolute ethyl alcohol were heated under reflux for about 30 minutes. The dye separated from the cooled reaction mixture. It was recrystallized three times from ethyl alcohol and obtained as dark blue crystals melting at 179-182° C. with decomposition. Its ethyl alcoholic solution is bluish red.

EXAMPLE 14

5 - (5 - diethylamino - $\Delta^{2,4}$ - pentadienylidene) - 3-ethylrhodanine

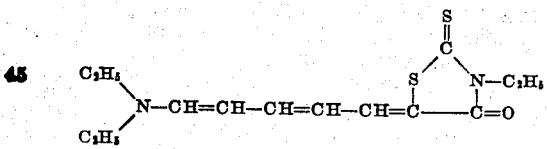

0.9 g. (1 mol.) of 5-(5-acetanilido-$\Delta^{2,4}$-pentadienylidene)-3-ethylrhodanine, 0.9 g. (3 mol.) of diethylamine and 10 cc. of absolute ethyl alcohol were heated under reflux for about 30 minutes. The dye separated from the cooled reaction mixture and after several recrystallizations from ethyl alcohol was obtained as steel blue needles melting at 112.5-114.5° C. with decomposition. Its ethyl alcoholic solution was bluish red.

In the above three examples, the piperidine, diethylamine and morpholine can be replaced with any of the basic non-aromatic primary or secondary amines pointed out in the above in connection with reaction with compounds of Formula III above. The 3-ethylrhodanine can be replaced by any heterocyclic compound containing a nuclear methylene group adjacent to a nuclear carbonyl group, such as correspond to the heterocyclic nuclei pointed out under Formula II above.

To prepare dyes of Formula II where Z represents the non-metallic atoms necessary to complete a 2-alkylmercapto-4(5)-imidazolone nucleus, dyes of Formula II where Z represents the non-metallic atoms necessary to complete a rhodanine or a hydantoin (free from substituents in the 1- position) nucleus can be treated with alkylating agents. For example, dyes such as 5 - (1 - piperidyl) - methylenerhodanine, 5 - [$\gamma$-1-(piperidyl)allylidene] - rhodanine, 5 - [$\gamma$ - (4 - morpholyl)allylidene]-rhodanine, 5-[5-(1-piperidyl)-$\Delta^{2,4}$-pentadienylidene]-rhodanine, 5-(1-piperidyl) - methylenehydantoin, 5 - diethylaminomethylene-2-thiohydantoin,5-[$\gamma$-(1-piperidyl)allylidene] - 2 - thiohydantoin and 5 - [5 - (4 - morpholyl - $\Delta^{2,4}$ - pentadienylidene] - 2 - thiohydantoin can be alkylated by suspending one molecular proportion in methyl alcohol, adding about 1.2 mol. of powdered alkali, e. g. potassium hydroxide and then adding about 1.2 mol. of alkylating agent, e. g. dialkyl sulfates, or advantageously alkyl-p-toluene-sulfonates. The reaction mixture is refluxed for about 30 minutes ordinarily, though longer time may be required in some instances. The alkylated dye separates from the chilled reaction mixture.

All of the dyes, illustrations of which have been given above, are particularly useful in manufacturing photographic emulsions serving to alter the sensitivity thereof; these dyes are also useful in manufacturing light filters and in the dyeing of textiles, particularly textiles made from cellulose acetate yarn.

Related to the dyes illustrated above and coming under Formula I above are dyes which can be represented by the following formula:

VI
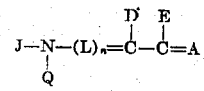

wherein A, L, $n$, J and Q have the values pointed out under Formulas I and II above and D represents a cyano (CN) group, an acyl group, such as acetyl, propionyl, butyryl, benzoyl or naphthoyl, a carboxyl group or a carbalkoxy group and E represents an aryl group, such as phenyl or naphthyl, an arylamino group, such as phenylamino or naphthyl amino, or an alkyl group, such as methyl, ethyl, or the like.

These new related dyes can be prepared in a manner similar to that illustrated above, i. e., by reacting a basic non-aromatic primary or secondary amine with a compound of the following formula:

VIII
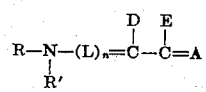

wherein A, $n$, R and R' have the values pointed out under Formula III above while D and E have the values pointed out under Formula VI above. The basic primary or secondary non-aromatic amines which can be reacted with compounds of Formula VII are the same as those pointed out above in connection with reaction with compounds of Formula III. The compounds of Formula VII are first obtained by methods similar to those illustrated above for preparing compounds of Formula III. Thus, for example, diphenylformamidine (in kerosene) or $\beta$-anilinoacrolein anil hydrochloride (in acetic anhydride) or glutaconic aldehyde dianilide hydrochloride (in acetic anhydride) can be condensed with the following: benzoylacetonitrile, naphthoylacetonitrile, cyanoacetanilide, malonic acid, diethylmalonate, acetoacetic ester, acetylacetone, benzoylacetone, or the like. The resulting compound is then converted to its acylated form if it is not already in that form. The acylation can be effected as illustrated in the above examples.

The following example which is not intended to limit my invention illustrates the preparation of my new dyes of Formula IV:

EXAMPLE 15

α-[γ-(1-piperidyl)-allylidene]-benzoylacetonitrile

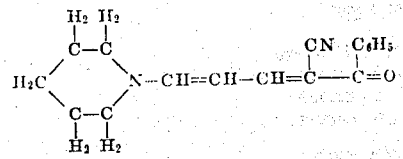

0.8 g. (1 mol.) of α-(γ-acetanilido-allylidene)-benzoylacetonitrile, 0.6 g. (3 mol.) of piperidine and 15 cc. of absolute ethyl alcohol were heated under reflux for about 30 minutes. The dye separated from the cooled reaction mixture and after two recrystallizations from methyl alcohol was obtained as orange-yellow needles melting at 160–162° C. with decomposition. Its methyl alcoholic solution was yellow.

The α-(γ-acetanilido-allylidene)-benzoylacetonitrile used in the above example was prepared by first refluxing for about 30 minutes 1.45 g. (1 mol.) of benzoylacetonitrile, 2.5 g. (1 mol.) of β-anilinoacrolein anil hydrochloride, 20 cc. of absolute ethyl alcohol and 1.0 g. (1 mol.) of triethylamine. The product separated from the cooled reaction mixture and was used in the crude form to prepare the acetanilido derivative as follows: 5.5 g. (1 mol.) of the crude product, 40 cc. of acetic anhydride and 2.0 g. of triethylamine were heated at 100° C. for about 10 minutes. The crude product separated from the cooled reaction mixture and after two recrystallizations from methyl alcohol was obtained as yellow needles melting at 208–210° C. with decomposition.

These new dyes of my invention represented by Formula VI are useful in preparing photographic emulsions, in preparing light filters and in the dyeing of textiles made from cellulose acetate yarn.

Dyes similar in structure to the preferred group of the dyes of my invention (represented by Formula II above) can be prepared from carbocyclic compounds containing a nuclear methylene group adjacent to a nuclear carbonyl group, e. g., from 1,3-cyclohexadione or from indandione or the like. The method of preparation is similar to that illustrated above, viz., first condensing the indandione or similar carbocyclic compound with a compound of Formula III followed by treating the resulting condensation product with a primary or secondary non-aromatic amine as illustrated above. The dyes from these carbocyclic compounds, such as indandione or 1,3-cyclohexadione, are of lesser utility in manufacturing photographic emulsions, but are suited for the preparation of light filters and can be used for dyeing of textiles made from cellulose acetate yarn.

From the breadth of description given throughout these specifications, it is clear that dyes containing simple substituents on the nuclei or methenyl (CH) chains are a part of my invention. Still further examples of the preparation of my new dyes could be given, but the foregoing will be sufficient to teach those skilled in the art the manner of obtaining my new dyes.

My new dyes can be called hemioxonol dyes. Those containing one methenyl group (where $n$ in Formulas I and II represents one) can be called simple hemioxonol dyes; those containing a chain of three methenyl groups (where $n$ represents three) can be called hemicarboxonol dyes, and those containing a chain of five methenyl groups (where $n$ represents five) can be called hemidicarboxonol dyes.

My new hemioxonol dyes give rise to photographic emulsions possessing novel sensitivity when incorporated therein. My invention is particularly directed to the customarily employed gelatino-silver-halide emulsions. However, my new hemioxonol dyes can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, for example, silver chloride or silver bromide emulsions which can contain other salts which may be light-sensitive. By way of illustration, the herein-described sensitized photographic emulsions were prepared employing ordinary gelatino-silver-chloride and gelatino-silver-bromide emulsions. My new simple hemioxonol dyes (where $n$ represents one) are advantageously employed with silver chloride emulsions. My new hemicarboxonol dyes are likewise advantageously employed in manufacturing sensitized silver chloride emulsions.

What I claim as my invention and desire to be secured by Letters Patent of the United States is:

1. A dye characterized by the following formula:

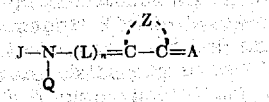

wherein A represents a divalent non-metallic atom selected from the group consisting of oxygen and sulfur, L represents a methenyl group, $n$ represents a positive odd integer not greater than five, J represents a substituent selected from the group consisting of hydrogen and alkyl groups when Q represents an alkyl group and J and Q together represent the non-metallic atoms necessary to complete an organic basic cyclic nucleus other than a pyrrol nucleus selected from the group consisting of five-membered and six-membered organic basic cyclic nuclei and Z represents the non-metallic atoms necessary to complete an organic heterocyclic nucleus selected from the group consisting of five-membered and six-membered organic heterocyclic nuclei.

2. A dye characterized by the following formula:

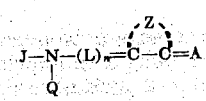

wherein A represents a divalent non-metallic atom selected from the group consisting of oxygen and sulfur, L represents a methenyl group, $n$ represents a positive odd integer not greater than five, J and Q together represent the non-metallic atoms necessary to complete a six-membered organic cyclic basic nucleus and Z represents the non-metallic atoms necessary to complete a five-membered heterocyclic nucleus containing a nuclear nitrogen and a nuclear sulfur atom.

3. A dye having the following formula:

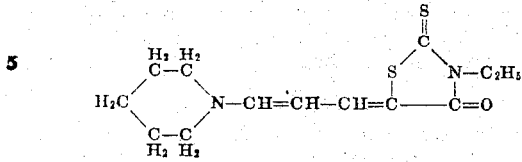

4. A dye having the following formula:

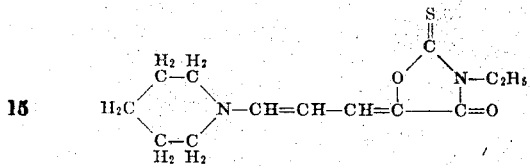

5. A dye having the following formula:

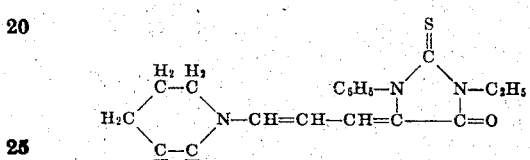

6. A process for preparing a dye comprising reacting an amine selected from the group consisting of primary and secondary non-aromatic basic amines other than pyrrol with a compound of the following formula:

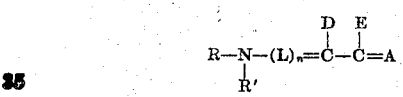

wherein A represents a divalent non-metallic atom of the oxygen group, L represents a methenyl group, $n$ represents a positive odd integer, D and E each represent organic groups, and E and D together represent the non-metallic atoms necessary to complete a cyclic organic nucleus, R represents an acyl group and R' represents an aryl group.

7. A process for preparing a dye comprising reacting an amine selected from the group consisting of primary and secondary non-aromatic basic amines other than pyrrol with a compound of the following formula:

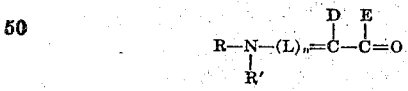

wherein L represents a methenyl group, $n$ represents a positive odd integer not greater than five, D and E each represent organic groups, and D and E together represent the non-metallic atoms necessary to complete a cyclic organic nucleus, R represents an acyl group and R' represents an aryl group.

8. A process for preparing a dye comprising reacting from about one and one-half to about three molecular proportions of an amine selected from the group consisting of primary and secondary non-aromatic basic amines other than pyrrol with a compound of the following formula:

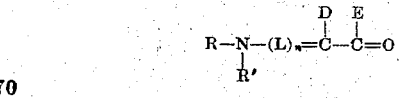

wherein L represents a methenyl group, $n$ represents a positive odd integer not greater than five, D and E each represent organic groups, and D and E together represent the non-metallic atoms necessary to complete a cyclic organic nucleus, R represents an acyl group and R' represents an aryl group.

9. A process for preparing a dye comprising reacting an amine selected from the group consisting of six-membered organic heterocyclic basic amines containing one —NH— group with a compound of the following formula:

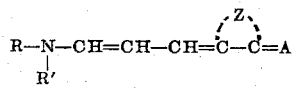

wherein A represents a divalent non-metallic atom selected from the group consisting of oxygen and sulfur, R represents an acetyl group, R' represents a phenyl group and Z represents the non-metallic atoms necessary to complete a heterocyclic nucleus selected from the group consisting of five-membered and six-membered heterocyclic nuclei.

10. A process for preparing a dye comprising reacting from about one and one-half to about three molecular proportions of an amine selected from the group consisting of six-membered organic heterocyclic basic amines containing one —NH— group with a compound of the following formula:

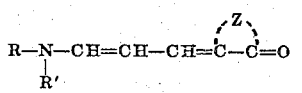

wherein R represents an acetyl group, R' represents a phenyl group and Z represents the non-metallic atoms necessary to complete a heterocyclic nucleus selected from the group consisting of five-membered and six-membered heterocyclic nuclei.

11. A process for preparing a dye comprising reacting from about one and one-half to about three molecular proportions of piperidine with a compound of the following formula:

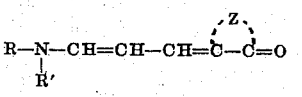

wherein R represents an acetyl group, R' represents a phenyl group and Z represents the non-metallic atoms necessary to complete a heterocyclic nucleus selected from the group consisting of five-membered and six-membered heterocyclic nuclei.

12. A process for preparing a dye comprising reacting from about one and one-half to about three molecular proportions of piperidine with a compound of the following formula:

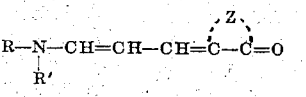

wherein R represents an acetyl group, R' represents a phenyl group and Z represents the non-metallic atoms necessary to complete a 2-thio-2,4(3,5)-thiazoledione nucleus.

13. A process for preparing a dye comprising reacting from about one and one-half to about three molecular proportions of piperidine with a compound of the following formula:

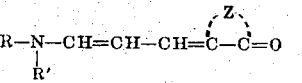

wherein R represents an acetyl group, R' represents a phenyl group and Z represents the non-metallic atoms necessary to complete a 3-alkyl-2-thio-2,4(3,5)-oxazoledione nucleus.

14. A process for preparing a dye comprising reacting from about one and one-half to about three molecular proportions of piperidine with a compound of the following formula:

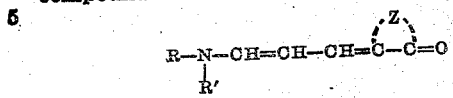

wherein R represents an acetyl group, R' represents a phenyl group and Z represents the non-metallic atoms necessary to complete a 2-thiohydantoin nucleus.

15. A dye having the following formula:

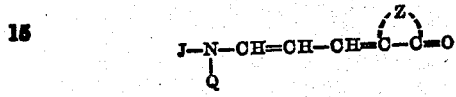

wherein J and Q together represent the non-metallic atoms necessary to complete a six-membered organic basic cyclic nucleus and Z represents the non-metallic atoms necessary to complete a 2-thio-2,4(3,5)-thiazoledione nucleus.

16. A dye having the following formula:

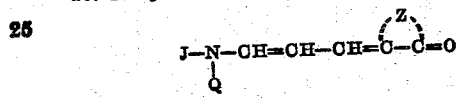

wherein J and Q together represent the non-metallic atoms necessary to complete a six-membered organic basic cyclic nucleus and Z represents the non-metallic atoms necessary to complete a 2-thiohydantoin nucleus.

17. A dye having the following formula:

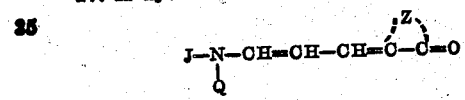

wherein J and Q together represent the non-metallic atoms necessary to complete a six-membered basic cyclic organic nucleus and Z represents the non-metallic atoms necessary to complete a 3-alkyl-2-thio-2,4(3,5)-oxazoledione nucleus.

18. A dye having the following formula:

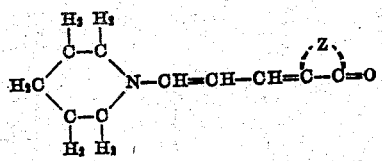

wherein Z represents the non-metallic atoms necessary to complete a 2-thio-2,4(3,5)-thiazoledione nucleus.

19. A dye having the following formula:

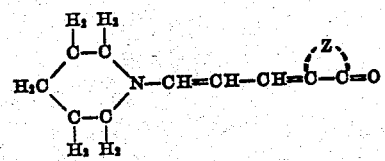

wherein Z represents the non-metallic atoms necessary to complete a 2-thiohydantoin nucleus.

20. A dye having the following formula:

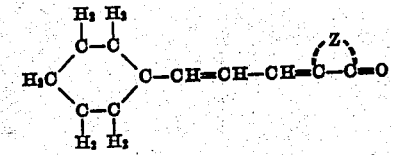

wherein Z represents the non-metallic atoms necessary to complete a 3-alkyl-2-thio-2,4(3,5)-oxazoledione nucleus.

GRAFTON H. KEYES.